(12) United States Patent
Ootani et al.

(10) Patent No.: US 8,606,729 B2
(45) Date of Patent: Dec. 10, 2013

(54) GAS BLOCKING DEVICE

(75) Inventors: Takuhisa Ootani, Nara (JP); Ryuji Iwamoto, Nara (JP); Mitsuo Yokohata, Osaka (JP); Kouichi Ueki, Nara (JP); Kazutaka Asano, Nara (JP); Hajime Miyata, Shiga (JP); Youichi Itou, Nara (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 13/321,362

(22) PCT Filed: May 19, 2010

(86) PCT No.: PCT/JP2010/003376
§ 371 (c)(1),
(2), (4) Date: Nov. 18, 2011

(87) PCT Pub. No.: WO2010/134338
PCT Pub. Date: Nov. 25, 2010

(65) Prior Publication Data
US 2012/0078828 A1 Mar. 29, 2012

(30) Foreign Application Priority Data

May 20, 2009 (JP) ................................. 2009-121650

(51) Int. Cl.
*G06N 5/00* (2006.01)
(52) U.S. Cl.
USPC .............................................. 706/12; 706/45
(58) Field of Classification Search
USPC .................................................... 706/12, 45
See application file for complete search history.

(56) References Cited

U.S. PATENT DOCUMENTS

| 5,369,598 | A | 11/1994 | Horiike et al. |
| 2010/0326548 | A1 | 12/2010 | Miyata et al. |
| 2011/0178732 | A1 | 7/2011 | Iwamoto |

FOREIGN PATENT DOCUMENTS

| JP | 04-307332 A | 10/1992 |
| JP | 2005-321197 A | 11/2005 |

(Continued)

OTHER PUBLICATIONS

Liu, et al., A New ART-Counterpropagation Neural Network for Solving a Forecasting Problem, Expert Systems with Applications 28, 2005, pp. 21-27.*

(Continued)

*Primary Examiner* — Wilbert L Starks
(74) *Attorney, Agent, or Firm* — Brinks Hofer Gilson & Lione

(57) ABSTRACT

A newly-purchased gas appliance is detected and reported to a gas administrator. There are provided a flow rate detection portion, a flow rate calculation portion, a code extraction portion, an initial code learning portion, a code maintaining portion, a code judging portion, an additional code learning portion, and an external communication portion. The code extraction portion extracts a code pattern E. The initial code learning portion gathers similar code patterns E as a gas appliance code pattern F. The code judging portion judges whether or not the code pattern E matches any of gas appliance code patterns F held by the code maintaining portion within a predetermined range. The code patterns E that have failed to match are subjected to additional identification of a gas appliance in the additional code learning portion. The gas cut-off device can thereby let the additional code learning portion detect whether or not a new gas appliance has emerged and the external communication portion send a report to the gas administrator.

5 Claims, 9 Drawing Sheets

| FLOW RATE DIFFERENCE VALUE | CODE |
|---|---|
| 1500 L/h ~ | 8 |
| 601 L/h ~ 1500 L/h | 7 |
| 301 L/h ~ 600 L/h | 6 |
| 101 L/h ~ 300 L/h | 5 |
| 51 L/h ~ 100 L/h | 4 |
| 11 L/h ~ 50 L/h | 3 |
| 6 L/h ~ 10 L/h | 2 |
| 0 L/h ~ 5 L/h | 1 |

(56) References Cited

FOREIGN PATENT DOCUMENTS

| | | |
|---|---|---|
| JP | 2008-180707 A | 8/2008 |
| JP | 2008-202818 A | 9/2008 |
| JP | 2008-309498 A | 12/2008 |
| JP | 2009-008623 A | 1/2009 |
| JP | 2009-041914 A | 2/2009 |
| WO | WO 2009/019871 A1 | 2/2009 |

OTHER PUBLICATIONS

International Search Report for International Application No. PCT/JP2010/003376, dated Jun. 22, 2010, 2 pages.

* cited by examiner

FIG. 2

| FLOW RATE DIFFERENCE VALUE | CODE |
|---|---|
| 1500L/h～ | 8 |
| 601L/h～1500L/h | 7 |
| 301L/h～ 600L/h | 6 |
| 101L/h～ 300L/h | 5 |
| 51L/h～ 100L/h | 4 |
| 11L/h～ 50L/h | 3 |
| 6L/h～ 10L/h | 2 |
| 0L/h～ 5L/h | 1 |

(a) STARTUP PATTERN OF GAS APPLIANCE A (b) CODE EXTRACTION

|  | (2) | (3) | (4) | (5) | (6) | (7) | (8) |
|---|---|---|---|---|---|---|---|
| FIRST TIME | 7 | 1 | 5 | 1 | 1 | 1 | 1 |
| SECOND TIME | 7 | 2 | 5 | 1 | 1 | 1 | 1 |
| THIRD TIME | 7 | 1 | 4 | 1 | 1 | 1 | 1 |
| FOURTH TIME | 7 | 1 | 5 | 1 | 1 | 1 | 1 |
| : |  |  |  |  |  |  |  |
| "nth" TIME | 7 | 2 | 4 | 1 | 1 | 1 | 1 |

FIG. 5  Prior Art (a) CODE PATTERN SUMMARY

| | CODE PATTERN | | | | TIMES EMERGED |
|---|---|---|---|---|---|
| 1 | 7 | 1 | 5 | 1 | 9 |
| 2 | 7 | 2 | 5 | 1 | 6 |
| 3 | 7 | 4 | 6 | 2 | 10 |
| 4 | 7 | 1 | 4 | 1 | 2 |
| 5 | 7 | 3 | 6 | 2 | 7 |
| 6 | 7 | 4 | 5 | 2 | 14 |
| 7 | 7 | 3 | 5 | 2 | 1 |
| n | 7 | 2 | 4 | 1 | 4 |

(b) EMERGED STANDARD NUMBER OF TIMES OR MORE

| | CODE PATTERN | | | | TIMES EMERGED |
|---|---|---|---|---|---|
| 1 | 7 | 1 | 5 | 1 | 9 |
| 2 | 7 | 2 | 5 | 1 | 6 |
| 3 | 7 | 4 | 6 | 2 | 10 |
| 4 | 7 | 3 | 6 | 2 | 7 |
| 5 | 7 | 4 | 5 | 2 | 14 |

(c) DIFFERENCE NUMBER ACQUIRED DURING IDENTIFICATION OF FIRST APPLIANCE

| | CODE PATTERN | | | | DIFFERENCE NUMBER |
|---|---|---|---|---|---|
| 1 | 7 | 1 | 5 | 1 | |
| 2 | 7 | 2 | 5 | 1 | 1 |
| 3 | 7 | 4 | 6 | 2 | 5 |
| 4 | 7 | 3 | 6 | 2 | 4 |
| 5 | 7 | 4 | 5 | 2 | 4 |

(d) CALCULATION OF GAS APPLIANCE CODE PATTERN OF FIRST APPLIANCE

| | CODE PATTERN | | | |
|---|---|---|---|---|
| 1 | 7 | 1 | 5 | 1 |
| 2 | 7 | 2 | 5 | 1 |
| AVERAGE | 7 | 1.5 | 5 | 1 |
| FINAL VALUE | 7 | 2 | 5 | 1 |

(e) DIFFERENCE NUMBER ACQUIRED DURING IDENTIFICATION OF SECOND APPLIANCE

| | CODE PATTERN | | | | DIFFERENCE NUMBER |
|---|---|---|---|---|---|
| 3 | 7 | 4 | 6 | 2 | |
| 4 | 7 | 3 | 6 | 2 | 1 |
| 5 | 7 | 4 | 5 | 2 | 1 |

(f) CALCULATION OF GAS APPLIANCE CODE PATTERN OF SECOND APPLIANCE

| | CODE PATTERN | | | |
|---|---|---|---|---|
| 3 | 7 | 4 | 6 | 2 |
| 4 | 7 | 3 | 6 | 2 |
| 5 | 7 | 4 | 5 | 2 |
| AVERAGE | 7 | 3.6 | 5.6 | 2 |
| FINAL VALUE | 7 | 4 | 6 | 2 |

FIG. 6

| | REEMERGED CODE PATTERN | | | | DIFFERENCE NUMBER | | RESULT OF APPLIANCE IDENTIFICATION |
|---|---|---|---|---|---|---|---|
| | | | | | GAS APPLIANCE CODE PATTERN OF FIRST APPLIANCE [7 2 5 1] | GAS APPLIANCE CODE PATTERN OF SECOND APPLIANCE [7 4 6 2] | SECOND APPLIANCE |
| 1 | 7 | 4 | 5 | 2 | 3 | 1 | SECOND APPLIANCE |
| 2 | 7 | 1 | 5 | 1 | 1 | 5 | FIRST APPLIANCE |
| 3 | 7 | 4 | 6 | 2 | 4 | 0 | SECOND APPLIANCE |
| 4 | 7 | 1 | 4 | 1 | 2 | 6 | FIRST APPLIANCE |
| 5 | 7 | 3 | 6 | 2 | 3 | 1 | SECOND APPLIANCE |
| 6 | 7 | 4 | 5 | 2 | 3 | 1 | SECOND APPLIANCE |
| 7 | 7 | 3 | 5 | 2 | 2 | 2 | FIRST APPLIANCE/SECOND APPLIANCE |
| ... | | | | | | | |
| n | 7 | 2 | 4 | 1 | 1 | 5 | FIRST APPLIANCE |

GAS BLOCKING DEVICE

This application is a 371 application of PCT/JP2010/003376 having an international Filing date of May 19, 2010, which claims priority to JP2009-121650 filed on May 20, 2009, the entire contents of which are incorporated herein by reference.

TECHNICAL FIELD

The present invention is directed toward enhancing information gathering capability by means of which a gas administrator manages information about gas appliances owned by a gas user who is a client, to thus encourage replacement of a gas appliance, perform maintenance, and the like.

BACKGROUND ART

A gas cut-off device of this type has hitherto been mentioned in related art documents as a configuration, like that described in connection with Patent Document 1.

FIG. 5 shows a related art flow rate measurement device described in connection with Patent Document 1. As shown in FIG. 5, a rate of gas flow in a gas flow channel 102 is measured at a given time interval, and an arithmetic operation portion 108 computes a difference value of the measured flow rate at regular time intervals. By reference to a flow rate classification table 110a assigned codes that represent classification of a plurality of difference values made by the magnitude of difference values, a difference conversion portion 112 converts a computed difference value into a code. Further, a code sequence generation portion 114 is configured so as to generate a measurement code sequence from a set of codes generated at regular time intervals. An appliance identification portion 116 is configured so as to compare the measurement code sequence with a unique code sequence of each gas appliance, thereby judging a gas appliance that uses a gas.

RELATED ART DOCUMENT

Patent Document

Patent Document 1: JP-A-2008-309498

DISCLOSURE OF THE INVENTION

Problem that the Invention is to solve

Although Patent Document 1 provides a description about an appliance identification method, there are not any descriptions about an identification method used when a plurality of gas appliances are concurrently used and a method for coping with a case where a new gas appliance is added.

In the related art configuration, appliance unique code sequences of respective gas appliances must be preliminarily stored in an appliance unique code sequence information holding portion 118 in order to identify an appliance. The following problem is encountered when a gas appliance having an unregistered appliance unique code sequence is added. Moreover, even when a gas appliance that uses a flow range in the vicinity of a border value in the flow rate classification table 100a assigned codes has a registered appliance unique code sequence, the appliance unique code sequence will change for reasons of seasonal fluctuations in usage of flow, age deterioration, or the like, there arises a problem of the inability to identify a gas appliance with accuracy.

The present invention solves the problem and aims at preventing a code pattern, which would change for reasons of seasonal fluctuations usage of flow, age deterioration, or the like, from being erroneously judged as a new appliance; detecting a newly added gas appliance or a gas appliance that has not been used; and reporting the thus-detected gas appliance.

Means for Solving the Problem

In order to solve the foregoing problem, a gas cut-off device includes a flow rate measurement portion that measures a flow rate of gas passing through a gas passage; a code extraction portion that extracts a code corresponding to a difference between a flow rate newly measured by the flow rate measurement portion and a previously-measured flow rate and that outputs as a first code pattern a plurality of codes extracted during a predetermined period of time; an initial code learning portion that takes, as a target, a code pattern having emerged a predetermined number of times or more of the plurality of first code patterns output within a predetermined period of time and that takes similar code patterns as a gas appliance code pattern representing a specific gas appliance; and a code maintaining portion that maintains the gas appliance code patterns. Similar code patterns are collectively held as a gas appliance code pattern. Every time the code pattern is extracted, a match between the code pattern and the gas appliance code pattern is judged within a predetermined range. The code pattern changed for reasons of seasonal fluctuations in usage of flow, age deterioration, or the like, can be prevented from being erroneously judged as a new appliance.

Advantage of the Invention

The gas cut-off device of the present invention can eliminate influence on a code pattern, which would otherwise be caused by seasonal fluctuations in usage of flow, age deterioration, or the like, by judging a match within a predetermined range. Further, since similar code patterns can be gathered, the capacity of the RAM of the microcomputer that controls the gas cut-off device can be lessened.

BRIEF DESCRIPTION OF THE DRAWINGS

FIG. 2 is a tabulation showing code conversion based on flow rate difference values in the first embodiment.

FIGS. 5 (a) to (f) are explanatory views of code extraction of the first embodiment.

FIG. 6 is an explanatory view a code pattern tabulation of the first embodiment.

EMBODIMENTS FOR IMPLEMENTING THE INVENTION

Figure 1:
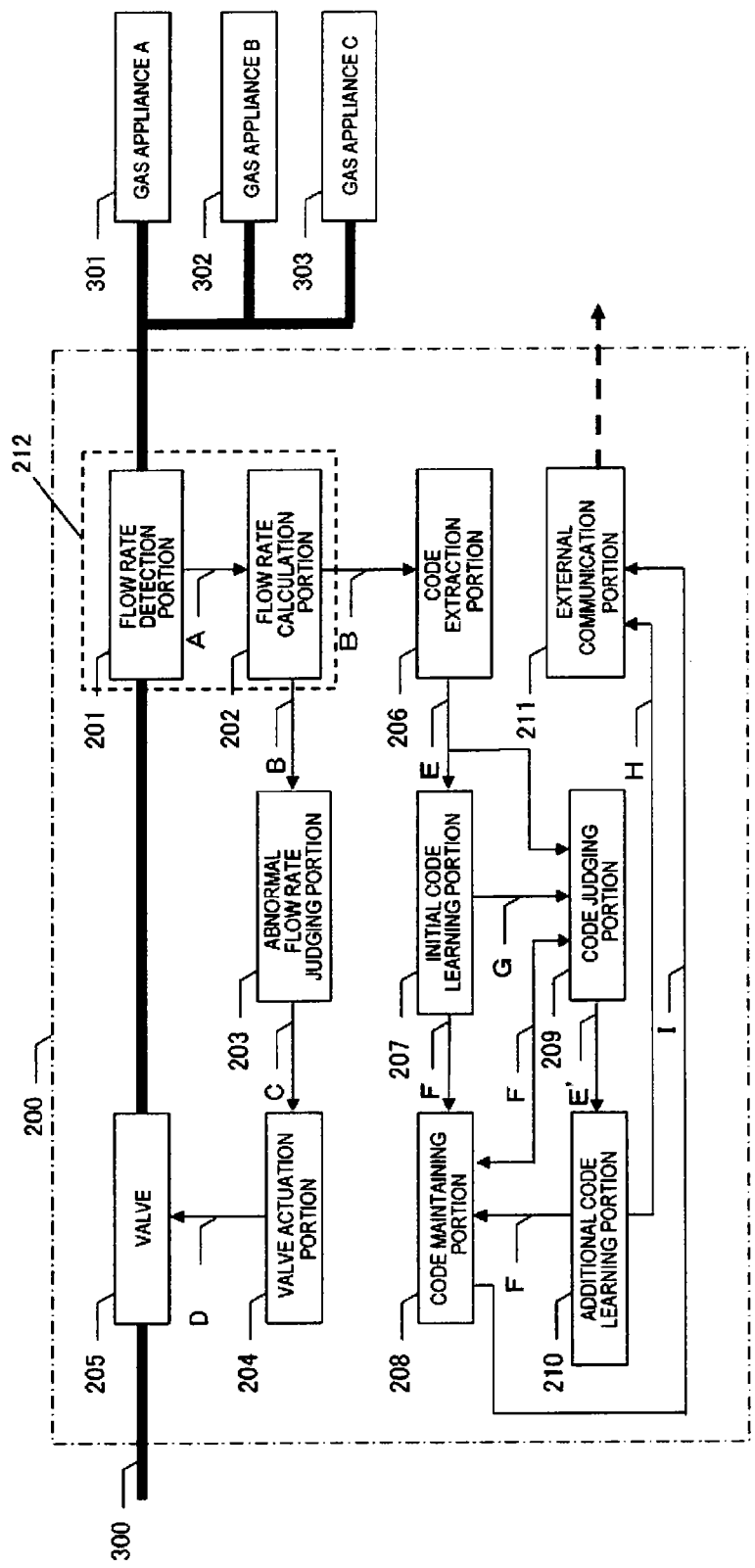
FIG. 1 is a functional block diagram of a gas cut-off device of a first embodiment of the present invention.

A first invention is directed toward a gas cut-off device comprising a flow rate measurement portion that measures a flow rate of gas passing through a gas passage; a code extraction portion that extracts a code corresponding to a difference between a flow rate newly measured by the flow rate measurement portion and a previously-measured flow rate and that outputs as a first code pattern a plurality of codes extracted during a predetermined period of time; an initial code learning portion that takes, as a target, a code pattern having emerged a predetermined number of times or more of the plurality of first code patterns output within a predetermined period of time and that takes similar code patterns as a gas appliance code pattern representing a specific gas appliance; and a code maintaining portion that maintains the gas appliance code patterns. Similar code patterns are collectively held as a gas appliance code pattern. Every time a code pattern is extracted, an identification is performed within a predetermined range as to whether or not a match exists between the code pattern and the gas appliance code pattern. Thus, a code pattern changed for reasons of occurrence of seasonal fluctuations, age deterioration, is prevented from being erroneously judged as a new appliance.

A second invention is based particularly on the first invention, wherein the gas cut-off device further includes a code judging portion that compares the first code pattern output from the code extraction portion with all of the gas appliance code patterns held by the code maintaining portion and that outputs the first code pattern as a second code pattern when the first code pattern does not match or is not similar to any of the gas appliance code patterns; and an additional code learning portion that takes, as a target, a code pattern having been output a predetermined number of times or more of the plurality of second code patterns output during a predetermined period of time and that takes similar code patterns as a new gas appliance code pattern representing a specific gas appliance, wherein the code maintaining portion additionally maintains the new gas appliance code pattern. Thus, a newly added gas appliance can be detected.

A third invention is based particularly on the second invention, wherein the gas cut-off device further includes an external communication portion, wherein, when the additional code learning portion outputs the new gas appliance code pattern, a report is sent, by way of the external communication portion, to a center that monitors the gas cut-off device. Thus, when addition of a new gas appliance is detected, the external communication portion sends a report to the center that monitors the gas cut-off device, thereby being able to assist updating of user's gas appliance information.

A fourth invention is based particularly on the second invention, wherein the code judging portion compares the first code pattern output from the code extraction portion with all of the gas appliance code patterns held by the code maintaining portion and, when the first code pattern matches or is similar to any of the gas appliance code patterns, outputs the first code pattern as a gas appliance code pattern; and the code maintaining portion has a timer for each of the held gas appliance code patterns and clears and lets a corresponding timer start counting when received the gas appliance code pattern from any of the code judging portion, the initial code learning portion, and the additional code learning portion, thereby deleting the corresponding gas appliance code patterns when a count of the timer has reached a predetermined value. Reemergence of the gas appliance code pattern is monitored. If the gas appliance code pattern does not appear even after elapse of a predetermined period of time, the gas appliance that has come out of use can be detected.

A fifth invention is based particularly on the fourth invention, wherein the gas cut-off device further includes an external communication portion, wherein a report is sent to a center that monitors the gas cut-off device by way of the external communication portion when the code maintaining portion deletes the gas appliance code pattern. As a result of a report being sent to the center that monitors the gas cut-off device, a reduction in the number of user's gas appliances can be reported.

Embodiments of the present invention are hereunder described by reference to the drawings. However, the present invention shall not be confined to the embodiments.

(First Embodiment)

FIG. 1 is a functional block diagram of a gas cut-off device 200 of a first embodiment of the present invention.

In FIG. 1, a flow rate measurement portion 212 is built from a flow rate detection portion 201 and a flow rate calculation portion 202. The flow rate detection portion 201 outputs a flow rate signal A in response to a rate of a gas flow in a gas passage 300. A gas flow rate can be detected by a difference in traveling time of ultrasonic waves detected by mutually-opposed ultrasonic sensors disposed within the gas passage 300; a gas flow rate can also be detected from vibrations that arise when a gas flow through a pathway for a gas flow created in the gas passage 300; or when a quantity of gas passed can also be measured and detected as a gas flow rate every time a given quantity of gas passed is achieved. Even in any of the cases, similar effects will be yielded. The following descriptions are given to a method for calculating the flow rate signal A from a difference in traveling time every second.

Upon receipt of the flow rate signal A from the flow rate detection portion 201, the flow rate calculation portion 202 calculates a flow rate B. The flow rate B can also be calculated by multiplying the flow rate signal A by; for instance, a coefficient that has been determined by weighting the previously-held flow rate signal A.

A code extraction portion 206 acquires the flow rate B from the flow rate calculation portion 202 and calculates a difference between the flow rate B acquired last time and the currently-received flow rate B and extracts a code for a time of acquisition of the current flow rate B from a code tabulation based on flow rate difference values shown in FIG. 2.

Next, during a predetermined period of time, the thus-extracted code is output as a code pattern. If an appliance exhibits its characteristic at startup, the word "predetermined period of time" will be set to 10 seconds that will elapse from when there is not the flow rate B until when the flow rate B emerges. Alternatively, the predetermined time can also be set to a period of time that elapses before four codes are detected since emergence of the flow rate B that is taken as a starting point. So long as a characteristic is yielded during control of an appliance rather than start-up of an appliance, the code pattern may also be output at a point in time when a change arises in flow rate B after emergence of the flow rate B.

Figure 3:
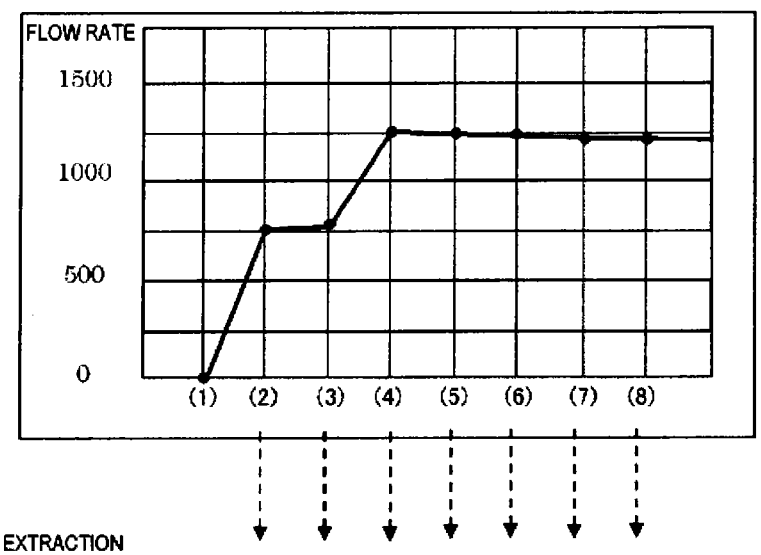
FIG. 3 (a) is a flow rate pattern diagram of a gas appliance A of the first embodiment, and FIG. 3 (b) is a tabulation showing extraction of a code from the flow rate pattern.

For instance, a startup pattern of a gas appliance A shown in FIG. 3(a) shows a change in flow rate occurred at the startup of a gas appliance A301. The gas appliance starts from a state (1) where a flow rate is low, and the flow rate has increased to 750 L/h at a point in time designated by (2). Therefore, a flow rate difference value comes to 750 L/h. The difference value is extracted as code [7] from FIG. 2. Likewise, at a point in time designated by (3) has the flow rate changed to 755 L/h. Since a flow rate difference value is 5 L/h, code [1] is extracted.

After codes have been sequentially extracted up to a point in time (8), the code extracted at first startup shifts in sequence of [7→1→5→1→1 →1→1]. Extraction of the code is performed "n" times in this sequence.

A code extraction table shown in FIG. 3(b) provides a summary of extraction results. At the second startup and subsequent startups, the difference value is in a vicinity of border values of the code table based on the flow rate difference values shown in FIG. 2. For this reason, results vary because of occurrence of seasonal fluctuations, age deterioration, a difference between use of the gas appliance by a gas user and timing at which a flow rate is measured, and the like. For instance, when a detection result shifts in sequence of 750 L/h→756 L/h→, the extracted code also changes like [7→2→5→1→1→1→1]. Thus, the code changes at a point in time (3) by 1 L/h that is a difference between 755 L/h and 756 L/h.

The code extraction portion 206 finally outputs top four codes [7151] of the extracted codes [7→1→5→1→1→1→1] as a code pattern E.

When received the code pattern E from the code extraction portion 206, an initial code learning portion 207 holds the thus-received code pattern and counts the number of times the same code pattern E appears.

Figure 4:
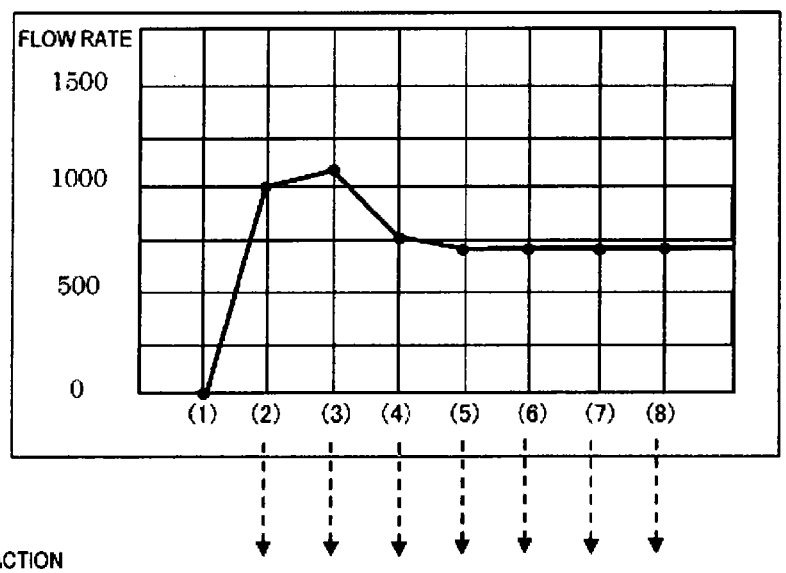
FIG. 4 (a) is a flow rate pattern diagram of a gas appliance B of the first embodiment, and FIG. 4 (b) it is a tabulation showing extraction of a code from the flow rate pattern.

In the meantime, a startup pattern of a gas appliance B shown in FIG. 4(a) shows a change in flow rate occurred at the startup of a gas appliance B302. When the gas user now owns both the gas appliance A301 and the gas appliance B302, there is not determined sequence or frequency of usage of the gas appliance A301 and the gas appliance B302 by the gas user; hence, usage of the gas appliances becomes random.

Consequently, when the gas appliance A301 and the gas appliance B302 start to be used one after another, the initial code learning portion 207 maintains a code pattern E in sequence of gas appliances used by the gas user, as represented by a code pattern tabulation shown in FIG. 5(a). The number of times respective code patterns E emerged is tallied.

Next, for a code pattern E emerged a predetermined number of times or more (for instance, five times or more) in a predetermined period of time (e.g., one month), the initial code learning portion 207 extracts the code patterns from a code pattern summary shown in FIG. 5(a). The thus-extracted code patterns make up a tabulation shown in FIG. 5(b) for code patterns emerged a standard number of times or more. Incidentally, when there is a desire to learn a seasonal commodity, like a fan heater, from the beginning, the predetermined period of time may also be set to one year.

Further, as a preliminary preparation to summarize similar code patters E, the initial code learning portion 207 determines, for each of codes of the code pattern E, a difference number between the first code pattern E "7151" that is the first code pattern in the tabulation shown in FIG. 5(b) pertaining to code patterns emerged a standard number of times or more and that serves as a reference and each code pattern E. FIG. 5(c) provides a summary of difference numbers determined during identification of a first appliance. Now, when the first code pattern E "7151" and the second code pattern E "7251" are decomposed on a per-code basis, we have |7−7|=0, |1−2|=1, |5−5|=0, and |1−1|=0; therefore, an accumulated total difference number comes to one.

Likewise, the first code pattern E "7151" and the third code pattern "7462" are decomposed on a per-code basis, we have |7−7|=0, |1−4|=3, |5−6|=1, and |1−2|=1; therefore, an accumulated total difference number comes to five.

Next, in order to collect similar code patterns E, the initial code learning portion 207 gathers code patterns that each have predetermined difference numbers or less (e.g., difference numbers of three or less). In FIG. 5(c) pertaining to difference numbers determined during identification of the first appliance, only the second code pattern E "7251" meets the requirement on the assumption that the first code pattern E "7151" in the tabulation is taken as a criterion. FIG. 5(d) pertaining to calculation of a gas appliance code pattern of the first appliance shows the first code pattern E and the second code pattern E.

Finally, the initial code learning portion 207 determines an average of the similar code patterns E on a per-code basis and calculates a final value by rounding off the average to the nearest whole number (or round-up or round-down operation. The thus-calculated final value is taken as a gas appliance code pattern F. During calculation of the gas appliance code pattern of the first appliance shown in FIG. 5(d), the top code of the first code pattern E is seven, and the top code of the second code pattern E is seven. Therefore, an average of the top codes comes to seven. Even when rounded off to the nearest whole number, the average comes to a value of seven. Determining an average is repeated up to the fourth code of the code pattern, whereby a gas appliance code pattern F comes to "7251."

The gas appliance code pattern F may also be determined by addition of a weighted number of times a code pattern emerged rather than by simple use of an average determined on a per-code basis. For instance, in relation to the second code in FIG. 5(d) pertaining to calculation of a gas appliance code pattern of a first appliance, an average value is determined as $(1\times9+2\times6)\div15=1.4$, and a resultant is rounded off to the nearest whole number to thereby come to one. Therefore, the thus-determined gas appliance code pattern F of the first appliance comes to "7151."

As to which the code pattern E "7251" or "7151" is suitable as a gas code pattern F of a first appliance, it is also possible to adopt either the code pattern E "7251," which has been determined during calculation of a gas appliance code pattern of a first appliance, or the code pattern E "7151," whichever has a smaller difference number.

In the present embodiment, when the gas appliance code pattern F is taken as "7251," an accumulated difference number of the first code pattern E "7151" comes to one. An accumulated difference number of the second code pattern E "7251" comes to zero, and its total difference number comes to one. In the meantime, when the gas appliance code pattern F is set to 7151, an accumulated difference number of the first code pattern E "7151" comes to zero, and an accumulated difference number of the code pattern E "7251" comes to one. A total difference number comes to one. Therefore, either the code pattern "7251" or "7151" may be adopted as the gas appliance code pattern F of the first appliance.

The difference number acquired during identification of a second appliance shown in FIG. 5(e) is obtained by subtracting the code patterns E in FIG. 5(d) that pertain to calculation of a gas appliance code pattern of a first appliance, from the code patterns E in FIG. 5(b) that pertain to code patterns appearing a standard number of times or more. While the top code pattern E "7462" is taken as a reference, a difference number is determined for each of codes of the code pattern E and for each of the code patterns E.

Moreover, calculation of a gas appliance code pattern of a second gas appliance shown in FIG. 5(f) is for determining a gas appliance code pattern F "7462" of a second appliance. Incidentally, even when a weighted gas appliance code pattern F of a second appliance is calculated, the gas appliance code pattern F comes to "7462" in the present embodiment.

Therefore, the gas appliance code pattern F "7251" (or "7151") of the first appliance is extracted and output from the code pattern E shown in FIG. 5(a) of the embodiment that pertain to a code pattern summary. Further, the gas appliance code pattern F "7462" of the second appliance is extracted from the code patterns E shown in the same. The thus-extracted gas appliance code patterns F "7251" and "7462" are output in combination as a code learning end signal G. Since the initial learning operation has ended, the code extraction portion 206 halts acceptance of the code patterns E from then on.

Since the present embodiment provides descriptions by reference to the gas appliance A301 and the gas appliance B302, code patterns, each of which has an accumulated difference number of four or more, are eliminated from FIG. 5(e) that pertain to difference numbers used during identification of a second appliance. However, when there are three or more gas appliances or when one gas appliance involves a plurality of startup patterns (a plurality of gas appliance code patterns F are registered even in connection with one gas appliance in this case), remaining code patterns E are gathered, and extraction of a gas appliance code pattern F is again performed.

Upon receipt of the gas appliance code pattern F from the initial code learning portion 207 and an additional code learning portion 210, a code maintaining portion 208 maintains the thus-received gas appliance code pattern F.

Upon receipt of the code learning end signal G from the initial code learning portion 207, a code judging portion 209 starts comparing the code pattern E of the code extraction portion 206 with all of the gas appliance code patterns F held in the code maintaining portion 208. When not all gas appliance code patterns F do not coincide with the code pattern E within a predetermined range, the code judging portion 209 outputs a code pattern E'. For instance, a difference number between the gas appliance code pattern F and the code pattern E is calculated for each of codes of the gas appliance code F and for each of the gas appliance code patterns F. When a resultantly-accumulated difference number comes to four or more, then code pattern E is determined as having no match.

FIG. 6 is a tabulation showing whether or not the code pattern E reemerged after initial learning operation is correctly judged as a registered gas appliance by use of the gas appliance code pattern F "7251" of the first appliance and the gas appliance code pattern F "7462" of the second appliance. FIG. 6 provides a plot of the code patterns E shown in FIG. 3(a) and FIG. 4(a). Reemerged code patterns are, in sequence from the top, the "second appliance, the "first appliance, the "second appliance," the "first appliance," the "second appliance," the "second appliance," the "second appliance," and the "first appliance."

As mentioned above, the code maintaining portion 208 compares, on a per-code basis, an accumulated difference number between the code pattern E and the gas appliance code pattern F "7251" of the first appliance with an accumulated difference number between the code pattern E and the gas appliance code pattern F "7462" of the second appliance. The gas appliance code pattern F having a smaller accumulated difference number is taken as an identified gas appliance.

A seventh code pattern E (hatched in the tabulation) shown in FIG. 6 has an accumulated difference number of two and has not been judged as the first gas appliance or the second gas appliance. However, the seventh code pattern E is not recognized as an additional new gas appliance. Hence, the seventh code pattern does not deviate from the characteristic of the present patent application. For instance, although the flow rate difference value is described as an absolute value in the present embodiment, the seventh code pattern E can also be uniquely judged, so long as negative and positive signs are assigned to the flow rate difference value. Specifically, when the code patterns are assigned positive and negative signs, the seventh code pattern E comes to "73(−5)(−2)." In the meantime, the gas appliance code pattern F of the first appliance comes to "725(−1)," and the gas appliance code pattern F of the second appliance comes to "74(−6)(−2)." As a consequence, the accumulated difference number comes to 12 for the first appliance and 2 for the second appliance. Therefore, the difference number acquired in connection with the second appliance is smaller, so that the seventh code pattern E can be correctly judged as the second appliance.

An explanation is now given to a case where a match does not exist, within a predetermined range, between the code pattern E and all of the gas appliance code patterns F held in the code maintaining portion 208.

Figure 7:
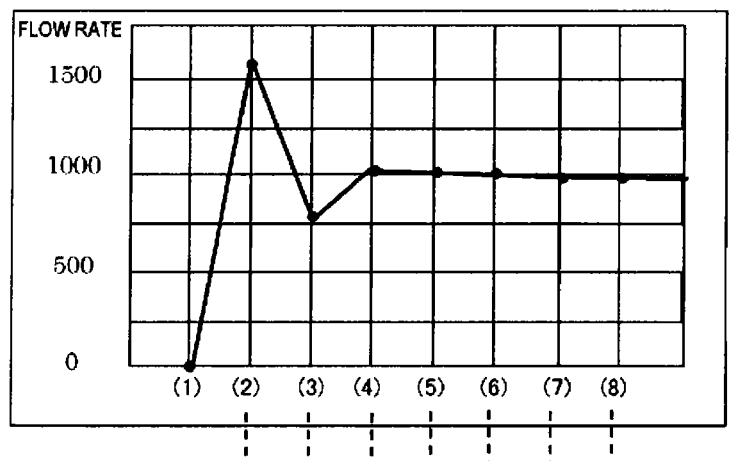
FIG. 7 (a) is a flow rate pattern diagram of a gas appliance C of the first embodiment, and FIG. 7 (b) is a tabulation showing extraction of a code from the flow rate pattern.

A startup pattern of a gas appliance C shown in FIG. 7(a) shows a change in flow rate achieved at startup of a gas appliance C303. When use of the gas appliance C exhibiting such a characteristic is started, the code extraction portion 206 sends a first code pattern E as "8761." At this time, an accumulated difference number between the code pattern E "8761" and the gas appliance code pattern F "7251" of the first appliance held in the code maintaining portion 208 comes to seven. Further, an accumulated difference number between the code pattern E "8761" and the gas appliance code pattern F "7462" of the second appliance held in the code maintaining portion 208 comes to five. Therefore, since neither of the gas appliance code patterns F match the code pattern E within a predetermined range (e.g., a value of four or more), a code pattern E' "8761" is output to the additional code learning portion 210.

Upon receipt of the code pattern E' from the code judging portion 209, the additional code learning portion 210 maintains the thus-received code pattern E' and counts the number of times the same code pattern E' emerged.

The additional code learning portion 210 is directed to the code pattern E' emerged a predetermined number of times or more within a predetermined period of time (e.g., a month for each code pattern E). The additional code learning portion 210 gathers similar code patterns E' and outputs one gas appliance code pattern F or more and an appliance addition signal H.

Further, the additional code learning portion 210 deletes the code patterns E' not emerged the predetermined number of times within the predetermined period of time. Alternatively, the predetermined period may not be set for each of the code patterns E. Further, foregoing processing can also be implemented with regard to all of the code patterns E held at a point in time when a free-running timer has counted one month.

A method for extracting the gas appliance code pattern F is identical with the procedures employed by the initial code learning portion 207.

In the present embodiment, the code pattern E "8761" is detected a plurality of times as is the startup pattern of the gas appliance C shown in FIG. 7(a), whereby the gas appliance C303 comes to be additionally learned as a gas appliance code pattern F "8761" of a third appliance.

Upon receipt of the appliance addition signal H of the additional code learning portion 210 (when received a report about a high possibility of a new gas appliance having been added), an external communication portion 211 sends a report to the outside. External reports; for instance, a report sent over a public phone line, the Internet, and a private wired or wireless line, and the like, also yield the same effects.

An abnormal flow rate judging portion 203 compares a flow rate B of the flow rate calculation portion 202 with an anomaly judging flow rate, thereby judging occurrence of an anomaly. When an anomaly is judged, a valve actuation signal C is output. For instance, when the flow rate B exceeds the maximum usage of gas allowed for the gas cut-off device 200 or when the flow rate B surpasses a serviceable time set for each arbitrary usage of gas derived from the flow rate B, an anomaly is judged to have occurred. Upon receipt of the valve actuation signal C from the abnormal flow rate judging portion 203, the valve actuation portion 204 outputs a valve close signal D. Upon receipt of the valve close signal D from the valve actuation portion 204, a valve 205 closes the gas passage 300.

As mentioned above, in the embodiment, when the additional code learning portion 210 has detected addition of a new gas appliance, the external communication portion 211 has a function of sending a report to a center that monitors the gas cut-off device 200. A gas administrator can thereby know an addition to the user's gas appliances, ascertain the nature of the new gas appliance by phone, or the like, and update registration of gas appliance information. On the basis of the registration information, it becomes possible to enhance safety during use of a gas by informing a time when the gas appliances need maintenance and urging the user to replace an outdated gas appliance by purchase, to thus enhance safety during use of gas.

(Second Embodiment)

Figure 8:
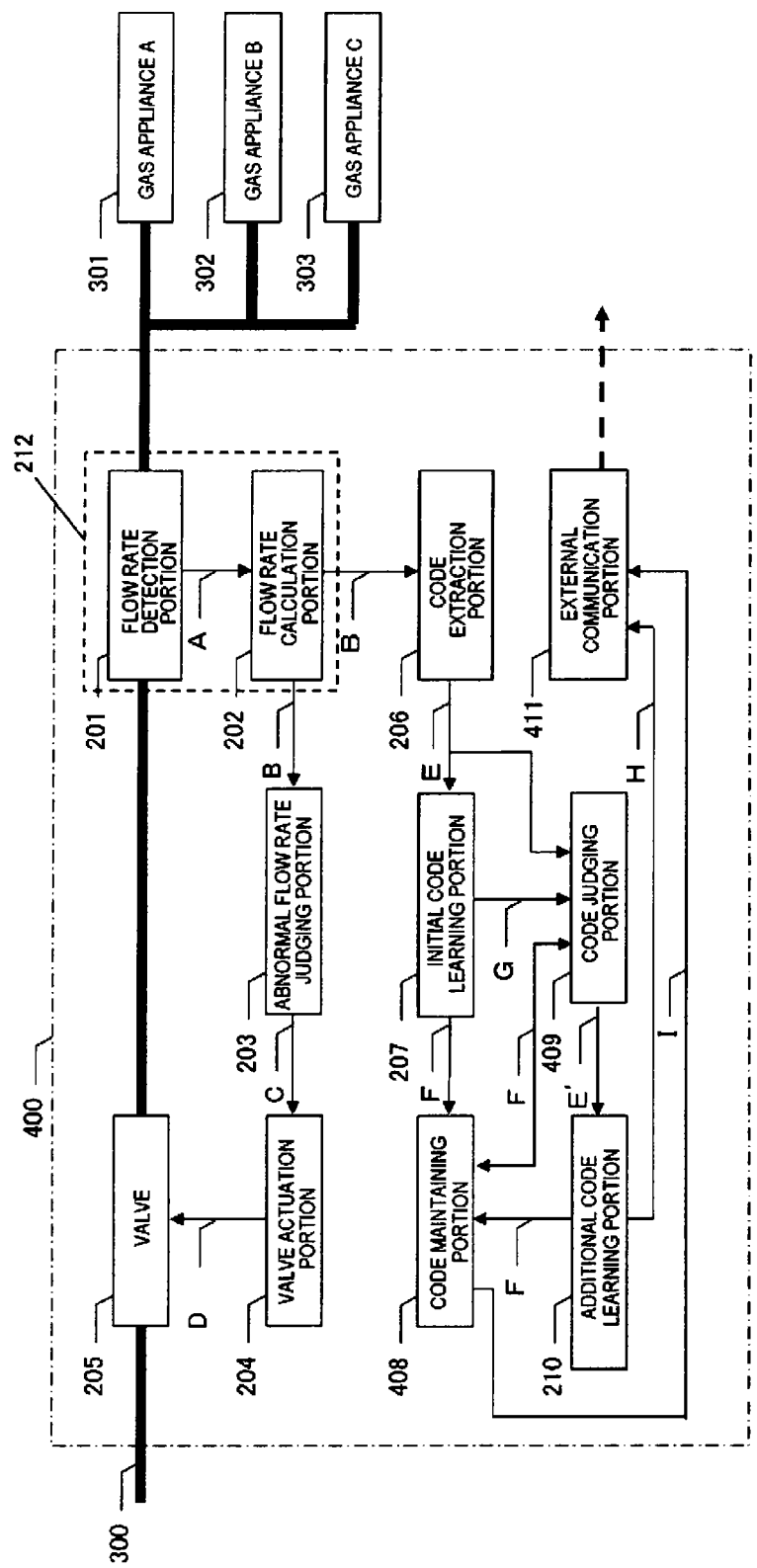
FIG. 8 is a functional block diagram of a gas cut-off device of a second embodiment of the present invention.
Figure 9:
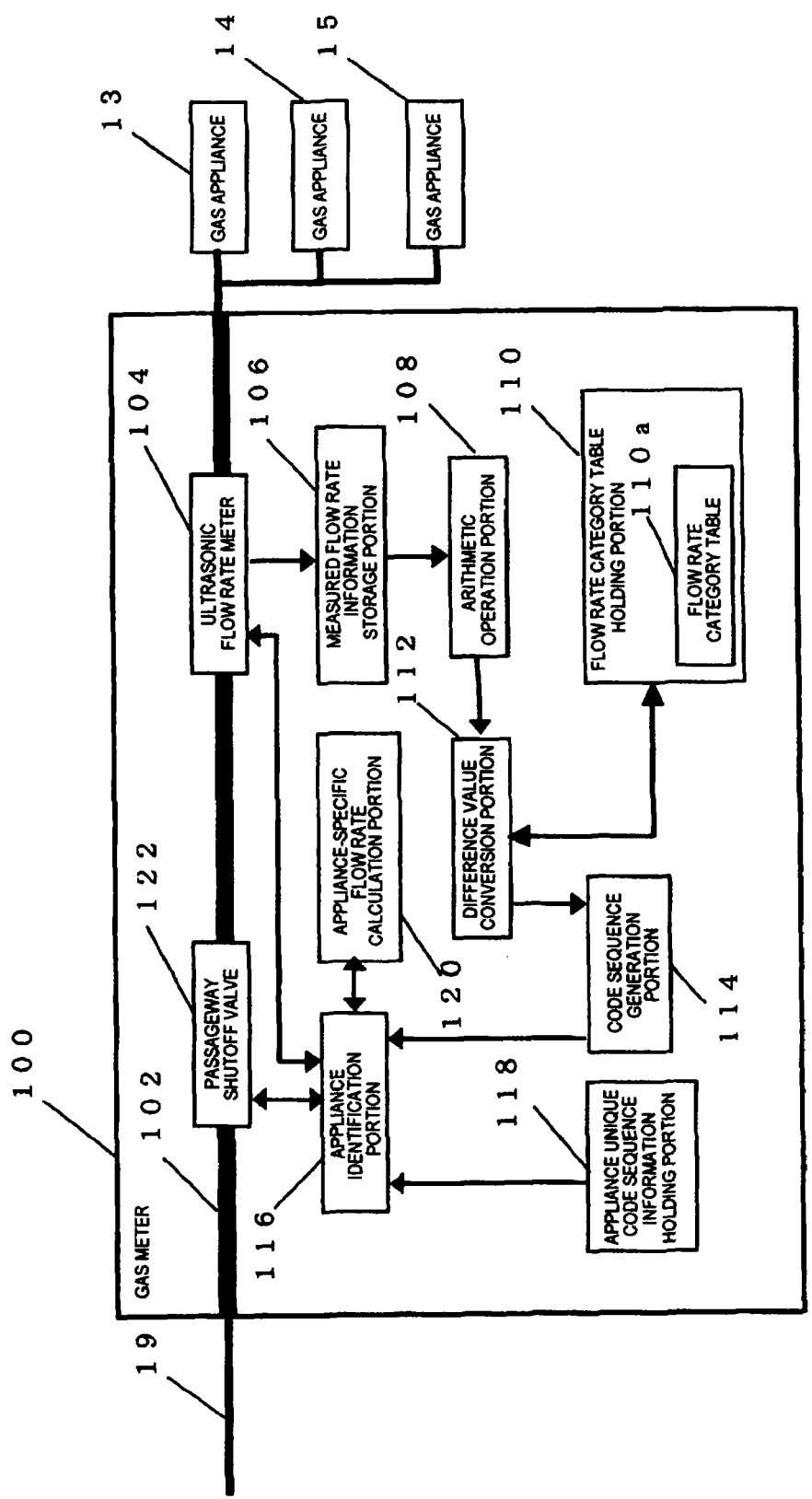
FIG. 9 is a functional block diagram of a related art gas cut-off device.

FIG. 8 shows a functional block diagram of a gas cut-off device 400 of a second embodiment of the present invention. Reference symbols that are the same as those employed in the first embodiment exhibit the same functions, and hence their repeated explanations are omitted.

Upon receipt of the code learning end signal G from the initial code learning portion 207 at this time, a code judging portion 409 starts comparing the code pattern E from the code extraction portion 206 with all of the gas appliance code patterns F held in the code maintaining portion 408. When no match exists between the code pattern E and all of the gas appliance code patterns F within a predetermined range, the code judging portion 409 outputs a code pattern E when the code pattern E. For instance, a difference number between the gas appliance code pattern F and the code pattern E is calculated for each of codes in the gas appliance code pattern F and for each of the gas appliance code patterns F. When an accumulated difference number comes to four or more, the code pattern E is judged not to have a match. In the meantime, when the code pattern E and the gas appliance code pattern F match each other within the predetermined range, the code judging portion 409 outputs the thus-matched gas appliance code pattern F. For instance, a difference value between the code pattern E and the gas appliance code pattern F is calculated on a per-code basis for each of the gas appliance code patterns F. When an accumulated difference number comes to three or less, the code pattern E is judged to have a match.

Upon receipt of the gas appliance code pattern F from the initial code learning portion 207 or the additional code learning portion 210, the code maintaining portion 408 clears and lets an elapse counter start counting (namely, start counting for new registration) while holding the gas appliance code pattern F. Upon receipt of the gas appliance code pattern F from the code judging portion 209, the code maintaining portion 408 clears and lets the elapse counter start counting (i.e., start recounting for reasons of reemergence). When the elapse counter that counts a time elapsed since the gas appliance code pattern F was held (reemerged) has counted up to a predetermined value (e.g., one year), the code maintaining portion 408 deletes the gas appliance code pattern F and outputs an appliance delete signal I.

Upon receipt of an appliance addition signal H of the additional code learning portion 210 (a report showing a high possibility of addition of a new gas appliance) or an appliance delete signal I (a report showing a high possibility of disposal of the gas appliance) from the code maintaining portion 408, an external communication portion 411 sends a report to the outside.

As mentioned above, in the present embodiment, the code maintaining portion 408 monitors reemergence of the gas appliance code pattern F. When the gas appliance code pattern F does not again emerge even after elapse of a predetermined period of time, the code maintaining portion 408 has a function of sending a report to the center that monitors the gas cut-off device 400. The gas administrator can thereby know a reduction in the number of user's gas appliances and ascertain which one of the gas appliances was discarded by phone, or the like. Thus, the gas administer becomes possible to inform the user of a modification to a maintenance schedule and an alternative appliance.

The present invention will also be subjected to various alterations or applications by the persons skilled in the art on the basis of the descriptions of the present patent application and the well-known techniques without departing the spirit and scope of the present invention. The alterations or modifications shall also fall within the range where protection of the present invention is sought. Further, the respective constituent elements described in connection with the embodiments can also be arbitrarily combined without departing the scope of the spirit of the present invention.

The present patent application is based on Japanese Patent Application (JP-2009-121650) filed on May 20, 2009, the entire subject matter of which is incorporated herein by reference.

INDUSTRIAL APPLICABILITY

As mentioned above, the gas cut-off device of the present invention collectively holds similar code patterns as gas appliance code patterns. Every time the code pattern is extracted, the code pattern and any of the gas appliance code patterns are judged to have a match within a predetermined range. Thus, in relation to influence of a code pattern that has changed for reasons of seasonal fluctuations in usage of flow, an age deterioration, or the like, the gas cut-off device can be prevented from erroneously judging as a new appliance a code pattern changed for reasons of seasonal fluctuations in usage of flow, an age deterioration, or the like. Further, a newly added gas appliance (or a discarded gas appliance) can be detected and reported. Alternatively, since similar code patterns can be gathered, RAM capacity of a microcomputer that controls the gas cut-off device can also be lessened. Hence, if gas is replaced with electricity, water, or the like, the shutoff device can be applied to applications, like, an electric meter, a water meter, or the like.

The invention claimed is:

1. A gas cut-off device comprising:
a flow rate measurement portion that measures a flow rate of gas passing through a gas passage;
a code extraction portion that extracts a code corresponding to a difference between a flow rate newly measured by the flow rate measurement portion and a previously-measured flow rate and that outputs as a first code pattern a plurality of codes extracted during a predetermined period of time;
an initial code learning portion that takes, as a target, a code pattern having emerged a predetermined number of times or more of the plurality of first code patterns output within a predetermined period of time and that takes similar code patterns as a gas appliance code pattern representing a specific gas appliance; and a code maintaining portion that maintains the gas appliance code patterns.

2. The gas cut-off device according to claim 1, further comprising:

a code judging portion that compares the first code pattern output from the code extraction portion with all of the gas appliance code patterns held by the code maintaining portion and that outputs the first code pattern as a second code pattern when the first code pattern does not match or is not similar to any of the gas appliance code patterns; and an additional code learning portion that takes, as a target, a code pattern having been output a predetermined number of times or more of the plurality of second code patterns output during a predetermined period of time and that takes similar code patterns as a new gas appliance code pattern representing a specific gas appliance, wherein the code maintaining portion additionally maintains the new gas appliance code pattern.

3. The gas cut-off device according to claim 2, further comprising an external communication portion, wherein, when the additional code learning portion outputs the new gas appliance code pattern, a report is sent, by way of the external communication portion, to a center that monitors the gas cut-off device.

4. The gas cut-off device according to claim 2, wherein the code judging portion compares the first code pattern output from the code extraction portion with all of the gas appliance code patterns held by the code maintaining portion and, when the first code pattern matches or is similar to any of the gas appliance code patterns, outputs the first code pattern as a gas appliance code pattern; and the code maintaining portion has a timer for each of the held gas appliance code patterns and clears and lets a corresponding timer start counting when received the gas appliance code pattern from any of the code judging portion, the initial code learning portion, and the additional code learning portion, thereby deleting the corresponding gas appliance code patterns when a count of the timer has reached a predetermined value.

5. The gas cut-off device according to claim 4, further comprising an external communication portion, wherein a report is sent to a center that monitors the gas cut-off device by way of the external communication portion when the code maintaining portion deletes the gas appliance code pattern.

* * * * *